United States Patent
White

(10) Patent No.: US 6,860,415 B1
(45) Date of Patent: Mar. 1, 2005

(54) TELEVISION MOUNTING DEVICE FOR USE IN AN AUTOMOBILE

(76) Inventor: John H. White, 1309 San Juan Dr., Flint, MI (US) 48504

(*) Notice: Subject to any disclaimer, the term of this patent is extended or adjusted under 35 U.S.C. 154(b) by 141 days.

(21) Appl. No.: 10/316,646

(22) Filed: Dec. 11, 2002

(51) Int. Cl.$^7$ .................................... B60R 11/02
(52) U.S. Cl. .................. 224/275; 224/544; 224/572; 224/929; 248/917; 296/37.8
(58) Field of Search .................. 224/275, 539, 224/544, 572, 929; 280/727; 296/37.8, 37.14; 248/214, 917

(56) References Cited

U.S. PATENT DOCUMENTS

| | | | | |
|---|---|---|---|---|
| 3,827,772 A | * | 8/1974 | Johnson ...................... | 224/929 |
| 4,383,626 A | | 5/1983 | Weinblatt | |
| 4,585,196 A | * | 4/1986 | Cormier ..................... | 248/214 |
| 4,796,791 A | | 1/1989 | Goss et al. | |
| 4,982,996 A | | 1/1991 | Vottero-Fin et al. | |
| D328,185 S | * | 7/1992 | Harry ........................ | D12/424 |
| 5,397,160 A | | 3/1995 | Landry | |
| 5,664,714 A | | 9/1997 | Navarro et al. | |
| 5,667,179 A | * | 9/1997 | Rosen ........................ | 248/917 |
| 5,725,189 A | | 3/1998 | Landy | |
| 6,092,705 A | * | 7/2000 | Meritt ........................ | 224/275 |
| 6,097,448 A | * | 8/2000 | Perkins ........................ | 224/275 |
| 6,213,438 B1 | * | 4/2001 | Ostby et al. ................. | 224/539 |
| 6,338,429 B1 | | 1/2002 | Pesce | |
| 6,393,745 B1 | * | 5/2002 | Miki .......................... | 224/627 |
| 6,473,315 B2 | | 10/2002 | Denmeade | |
| 6,585,201 B1 | * | 7/2003 | Reed .......................... | 248/917 |
| 6,663,155 B1 | * | 12/2003 | Malone et al. .............. | 224/539 |
| 6,719,343 B2 | * | 4/2004 | Emerling et al. ........... | 224/539 |

FOREIGN PATENT DOCUMENTS

| | | |
|---|---|---|
| EP | 0 234 699 | 9/1987 |
| JP | 07132780 A | 11/1993 |
| JP | 2001105988 A | 4/2001 |

\* cited by examiner

*Primary Examiner*—Gary E. Elkins
(74) *Attorney, Agent, or Firm*—Rader, Fishman & Grauer PLLC

(57) ABSTRACT

A television mounting device for use in an automobile comprises a carrier, a platform, and two belt connectors. The television is enclosed in the carrier that can be in the form of a tote with rigid bottom and side walls. The rigid bottom wall is fixed to the platform that is removably attached to a between-front-seats console. Each of the two belt connectors consists of two complementing portions lockable to each other, each one portion being attached to a respective one of the side walls of the tote and each another portion being secured to a floor of the automobile, preferably integrally with an inside portion of a respective seat belt connector.

12 Claims, 4 Drawing Sheets

TELEVISION MOUNTING DEVICE FOR USE IN AN AUTOMOBILE

BACKGROUND OF THE INVENTION

1. Field of the Invention

The present invention relates to a device to enclose and support a television within a vehicle.

2. Description of the Related Art

Disclosed in the art have been various devices or stands used for enclosing entertainment components within a motor vehicle. The known prior art includes such U.S. patents as U.S. Pat. Nos. 4,383,626; 5,397,160; 5,664,714; 5,725,189; 6,097,448; and 6,338,429. Also, a commercially available unit—a Portable TV Tote for 9" TV/VCR Combo available from Steel Horse, Compton, Calif., comes with complex series of straps intended to go around both front seats of a vehicle. Unattached, the unit rests on a between-seat console. The unit does not appear to be secure enough against shifting, vibration: etc. It is also time-consuming to install and adjust all straps and pads of the unit. Therefore, there is still a need for such a compact device that can be easily installed and rest on a between-seat console in a vehicle compartment and provide a reliable support for a television.

SUMMARY OF THE INVENTION

The invention attains its objectives by offering particular means for securing a portable television in a vehicle with a console between front seats thereof. The means comprise means for enclosing the television, means detachably attaching the enclosing means to the console, and means releasably securing the enclosing means to a floor of the automobile. In the preferred embodiment, a television mounting device according to the invention comprises (a) tote carrier of the TV, (b) a platform adapted to be attached (e.g. bolted) to a tote carrier of the TV and provided with appropriate formations to generally conform to and interfit with the contours on a particular vehicle's console, and (c) two two-portion belt connectors where a first portion of each of the connectors is attached to a respective side wall of the carrier (e.g. bolted to it), whereas a second, complementary portion of each of the connectors is attached to the vehicle floor (e.g. bolted to a floor plate) and stays on the floor between seats when the TV is not in the vehicle.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

With reference to the drawings of FIGS. 1 through 4, a new television mounting device embodying the principles and concepts of the present invention and generally designated by a callout 10 will now be described.

Figure 1:
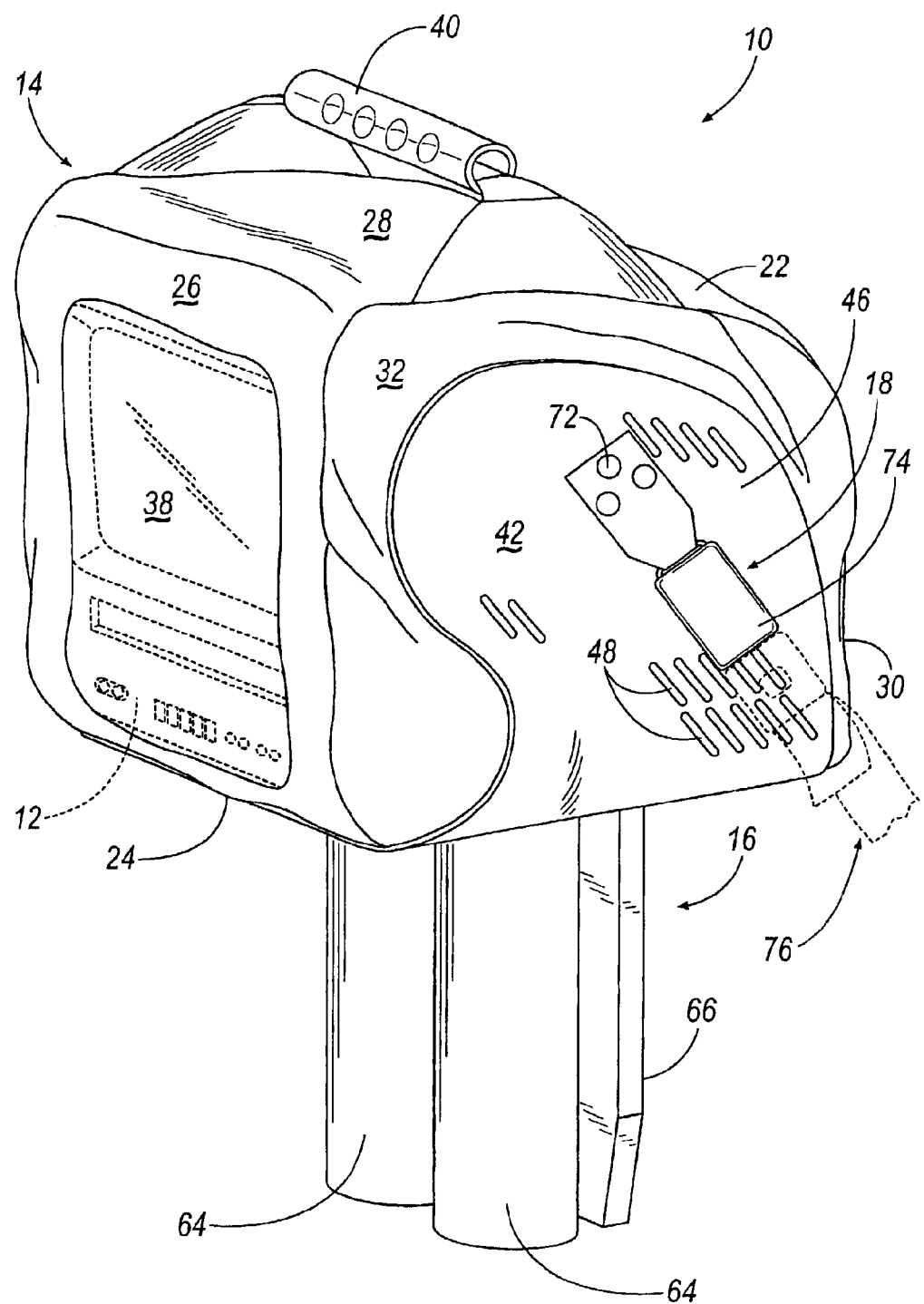
FIG. 1 is a schematic perspective view of a new television enclosing device according to the present invention, with the front face of a television set and a portion of the securing system shown in dotted lines.
Figure 2:
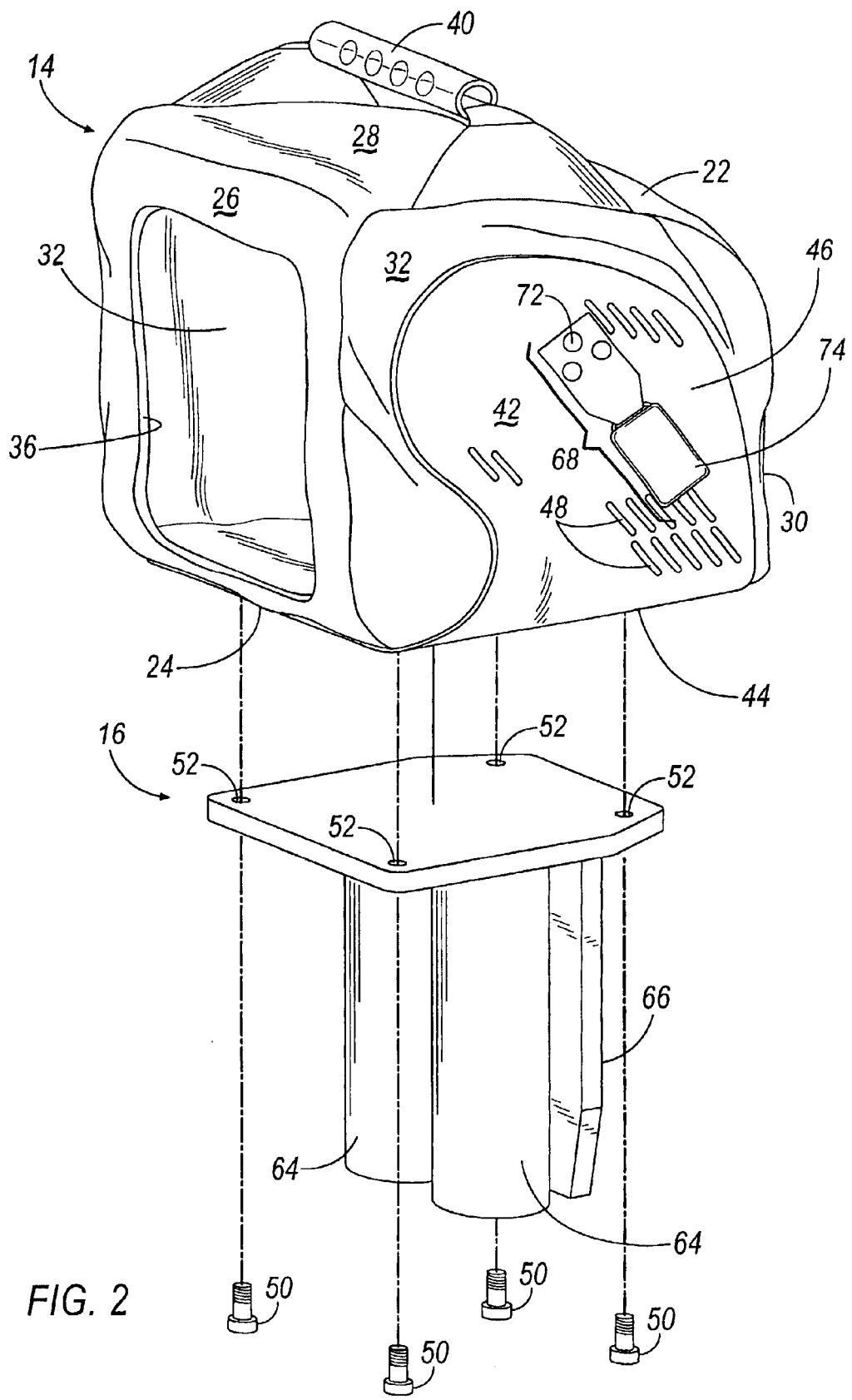
FIG. 2 is an exploded view of the enclosing structure shown in FIG. 1.
Figure 3:
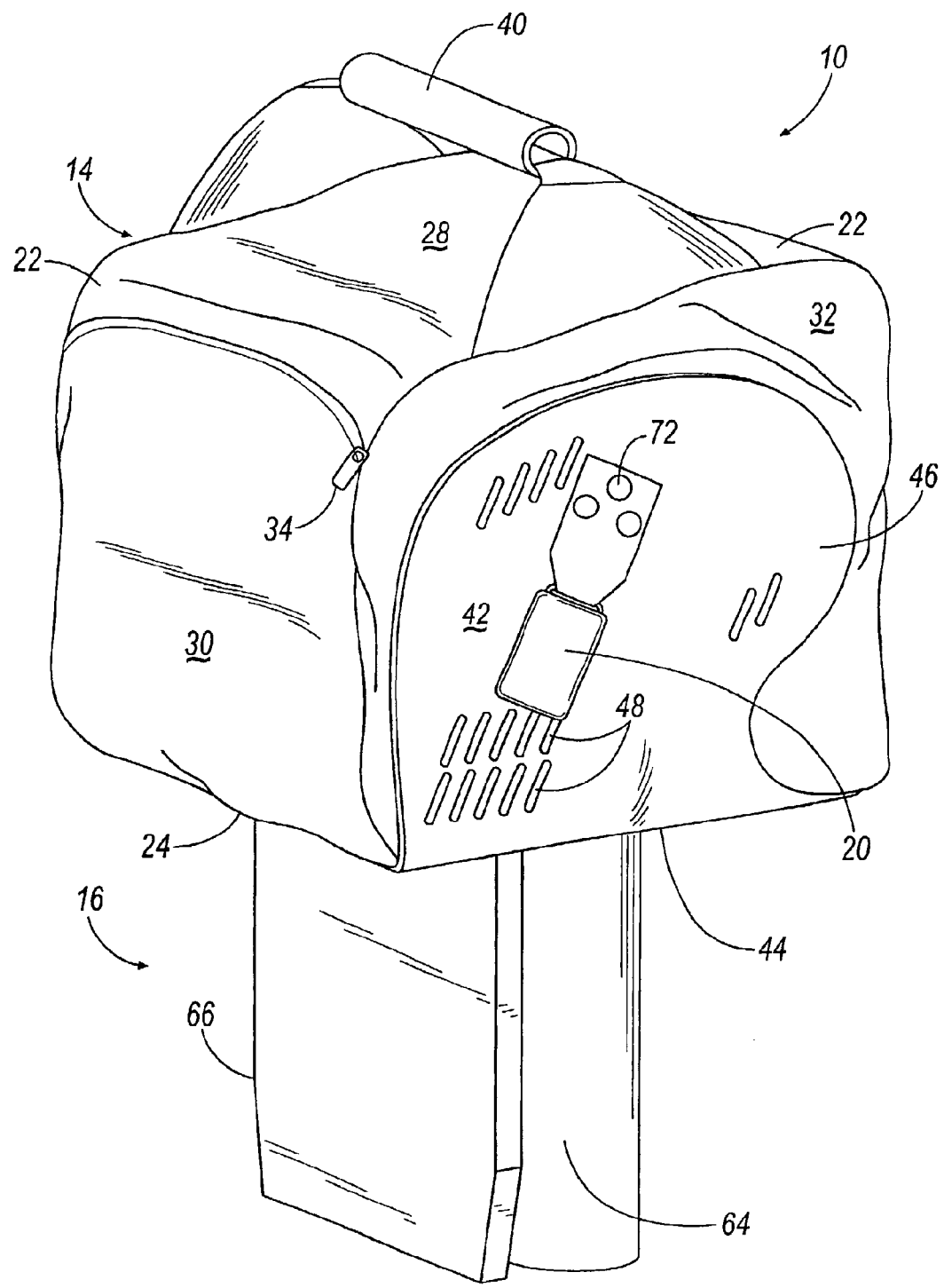
FIG. 3 is a schematic perspective view of a new television enclosing device according to the present invention, with the back of the structure visible.

As illustrated in FIGS. 1 through 4, the mounting device 10 for a television 12 generally comprises a carrier 14, a platform 16, and adjustable belt connectors 18 and 20. The carrier 14 preferably includes a fabric tote or carrier 22 that can serve both transportation and protection functions. The tote 22 has a bottom wall 24, a front wall 26, a top wall 28, a back wall 30, and a pair of side walls 32. The back wall 30 can be connected by a zipper 34 to the top and side walls as shown in FIG. 3. Through an opening (not shown) in the back wall, when unzipped, the television can be installed in, or removed from, the tote 22. In this case, the front wall 26 is provided with a cutout 36 to permit viewing the screen and control panel of the television.

Alternatively, the front wall 26 that covers the television screen 38 can be zippered to the top and side walls of the tote (not shown). With the front wall 26 unzippered and dropped down, it is through an opening therein (not shown) that the television 12 can be installed in, or removed from, the tote 22. The front wall 26 for this alternative may be of the type including a fold-out shelf having compartments for accessories and supported by straps attaching it to the tote, or having stops restricting the extent to which the front wall opens backward when unzippered. The tote 22 is also provided with a carrying handle 40.

Attached to the tote 22 and being a portion of the carrier 14 is a U-shape member 42. The attachment can be made by means of an adhesive, bolts, rivets, sewing, or any other convenient method. A base 44 of the U-shape member 42 accommodates the bottom wall 24, whereas wings 46 cover, at least partially, side walls 32 of the tote 22. The U-shape member can be made of metal or, preferably, of plastic to contribute to the rigidity of the whole structure of the carrier 14. It can also have slots 48 made to enhance ventilation in the tote.

Figure 4:
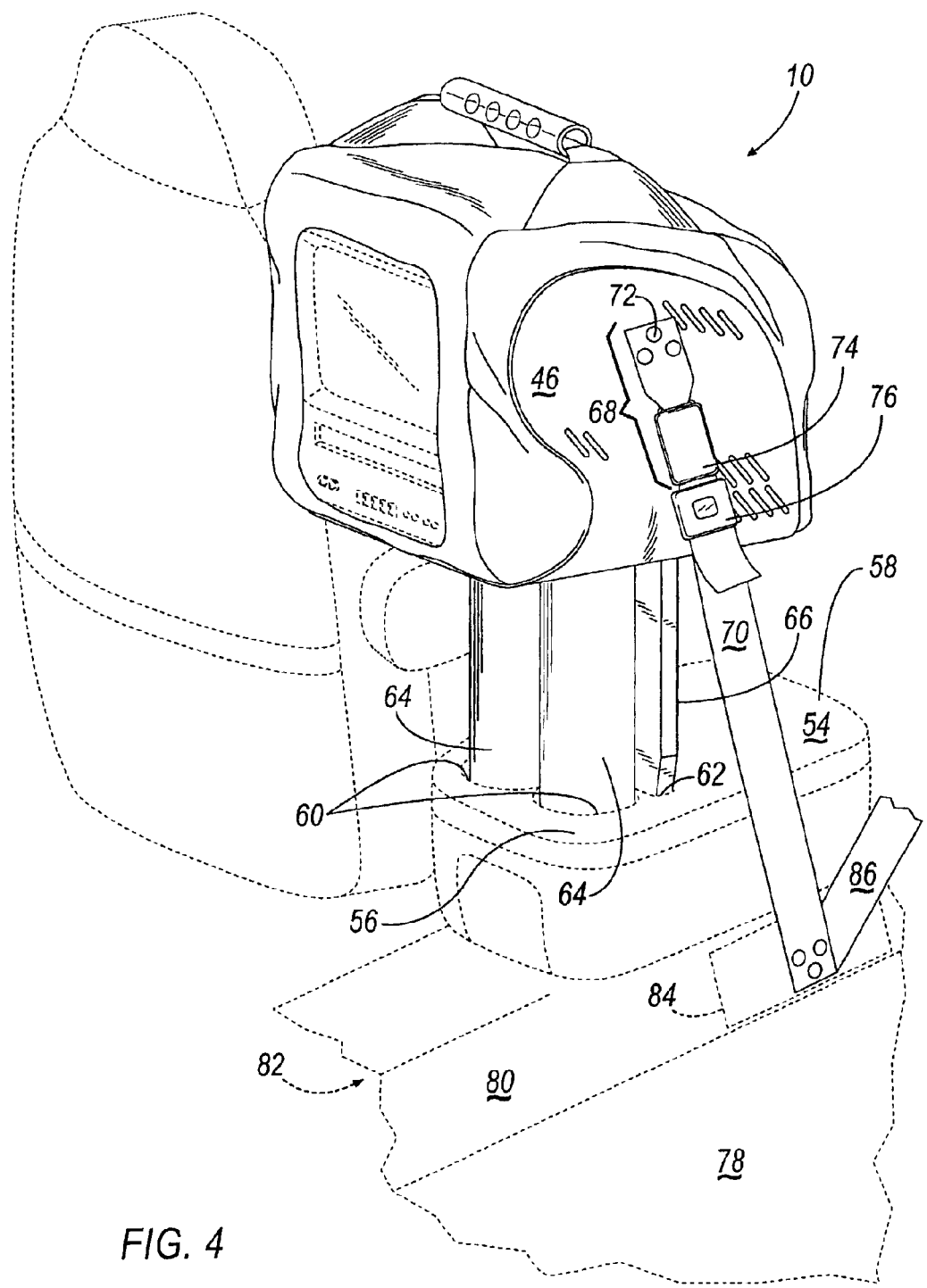
FIG. 4 is a perspective view of the device according to the present invention shown in a vehicle environment.

The platform 16, preferably made of molded plastic or metal, is fastened to the carrier 14, more specifically, to the base 44 of the U-shape member 42. This connection can be made by an adhesive, bolts, rivets, or any other convenient means. For the bolt-type connection, bolts 50 and holes 52 in the platform 16 are shown in FIG. 2. The present invention is preferably intended for the use in vehicles equipped with a between-front seat console 54, as shown in FIG. 4. Ford Excursion is an example of such vehicles and it is used herein merely to illustrate the manner of configuring the platform 16 to generally conform to and interfit with the console. It is to be understood that other platform configurations will typically be required for use with other specific vehicle consoles, while still utilizing the concepts of the present invention. The console is customarily provided with a cup receptacle portion 56 at a top surface 58 of the console 54 or adapted to be slid out therefrom as a separate member (not shown). The portion 56 has cup receptacles 60 and may also have an additional slot 62. To cooperate with this exemplary console, the platform 16 is made with complementary cylinders 64 and a plate 66 projecting from the platform substantially perpendicularly thereto and adapted to enter the cup receptacles 60 and slot 62, respectively.

There can be a number of alternative platforms for use with consoles that do not have distinct cavities, with which the cooperating platform formations can securely interfit. For example, the platform 16 can be shaped into a part (not shown) adapted to be attached to the tote and having a projection extending from its bottom surface to conform to a contour of the upper portion of the console and thus firmly straddle it.

As best shown in FIG. 4, each of the belt connectors 18 and 20 comprises a first portion 68 and a second portion 70 lockably connected to each other, with at least one of the portions having conventional means (not shown) to adjust its length. The first portions 68 are attached to the carrier 14. The attachment is made to the side walls 32 of the tote 22, specifically to the wings 46 of the U-shape member 42 that cover the side walls. A bolted connection 72 is preferably used for this purpose. While a three-bolt connection is shown, a single bolt or rivet could be used to permit pivotal adjustment of the angle of the connector. The first portions 68 may have a female lockable end designated in the drawings with callout 74, in which case the second portions 70 have a male lockable end designated in the drawings with callout 76, or vice versa. Specifically, the first portions 68 can be bolted through each of the wings 46 of the U-shape member 42 and side walls 32 of the tote 22, with about 6–9" length of the portions ending up with a female connector 74, whereas a 15–18" length of the second portions 70, with male connectors 76, is generally secured to a floor 78 of the vehicle or, as shown in FIG. 4, to a side wall 80 of a tunnel 82. This length of belt connectors stays between seats, on the floor, when the television is not in the vehicle. Preferably, the connection of the second portions is made to existing floor plates 84 that secure inside parts of vehicle front seat belts 86.

While several embodiments of the present invention have been disclosed in the above, it is to be understood that these embodiments are given by example only and not in a limiting sense. Those skilled in the art may make various modifications and additions to the preferred embodiments chosen to illustrate the invention without departing from the spirit and scope of the present contribution to the art. Accordingly, it is to be realized that the patent protection sought and to be afforded hereby shall be deemed to extend to the subject matter claimed and all equivalents thereof fairly within the scope of the invention.

What is claimed is:

1. A television mounting device for use in an automobile equipped with a between-front-seats console, the device comprising: a carrier, a platform, and two belt connectors, the carrier being shaped to have at least a bottom and two opposite sides, being adapted to receive and enclose the television, and being removably attached through the platform to the between-front-seats console, each of the two belt connectors comprising two complementing portions lockable to each other, a first portion being attached to a respective one of the opposite sides of the carrier and a second portion being secured to a floor of the automobile.

2. The television mounting device as claimed in claim 1, wherein the carrier is made in the form of a tote having a top, bottom, front, back, and two opposite side walls, the bottom and two opposite sides of the carrier being the bottom and two opposite side walls of the tote.

3. The television mounting device as claimed in claim 2, wherein the tote is provided with a U-shape member having a base portion and two side wing portions, said U-shape member covering the bottom and at least a portion of each of the side walls of the tote, said removable attachment of the carrier through the platform to the console being made by connecting the platform to said base portion, and said attachment of said first portion of each of the belt connectors to a respective one of the opposite sides of the carrier being made by connecting said first portion to a respective one of said two side wing portions.

4. The television mounting device as claimed in claim 3, wherein the attachment of the platform to the U-shape member of the tote is made with bolts.

5. The television mounting device as claimed in claim 1, wherein the second portion of each of the belt connectors is secured to the floor integrally with an inside portion of a seat belt connector.

6. The television mounting device as claimed in claim 1, wherein the platform is provided with two cylinders projecting therefrom substantially particularly to a plane of the platform, and the removable attachment of the platform to the console is made in the form of the two cylinders matching two cup receptacles in the console.

7. The television mounting device as claimed in claim 6, wherein the platform is further provided with a plate projecting from the platform to match a slot in the console.

8. A television mounting device for use in an automobile equipped with a between-front-seats console, the device comprising mean for enclosing the television, means detachably attaching the enclosing means to the console, and means releasably securing the enclosing means to a floor of the automobile, wherein the enclosing means includes a tote with a U-shape rigid member covering a bottom and at least a portion of each of side walls of the tote.

9. The television mounting device as claimed in claim 8 wherein the attaching means includes a platform attached to a bottom of the U-shape member of the tote and provided with formations matching formations in the console to assist in retaining the mounting device thereon.

10. The television mounting device as claimed in claim 8, wherein the securing means include two belt connectors, each of the two belt connectors comprising two complementing portions lockable to each other, one portion being attached to the tote with the U-shape rigid member and another portion being secured to a floor of the automobile.

11. The television mounting device as claimed in claim 10, wherein the U-shape rigid member includes a base portion covering a bottom and two side wing portions covering at least a portion of each of the side walls of the tote, and said attachment of one portion of each belt connectors to the tote with the U-shape rigid member made by connecting said one portion to a respective one of said wing portions of the U-shape member.

12. The television mounting device as claimed in claim 11, wherein the other portion of each of the belt connectors is secured to the floor integrally with an inside portion of a seat belt connector.

* * * * *

UNITED STATES PATENT AND TRADEMARK OFFICE
CERTIFICATE OF CORRECTION

PATENT NO. : 6,860,415 B1  Page 1 of 1
DATED : March 1, 2005
INVENTOR(S) : John H. White It is certified that error appears in the above-identified patent and that said Letters Patent is hereby corrected as shown below:

Column 4,
Line 18, please change "particularly" to -- perpendicularly --
Line 27, please change "mean" to -- means --
Line 33, please insert -- , -- after "8"
Line 49, please insert -- is -- after "member"

Signed and Sealed this

Seventh Day of June, 2005

JON W. DUDAS
*Director of the United States Patent and Trademark Office*